June 11, 1946.   G. L. LARISON   2,401,766
VEHICLE SUSPENSION
Filed Nov. 30, 1943   3 Sheets-Sheet 1

GLENN L. LARISON
INVENTOR

BY Geisler and Geisler
ATTORNEYS

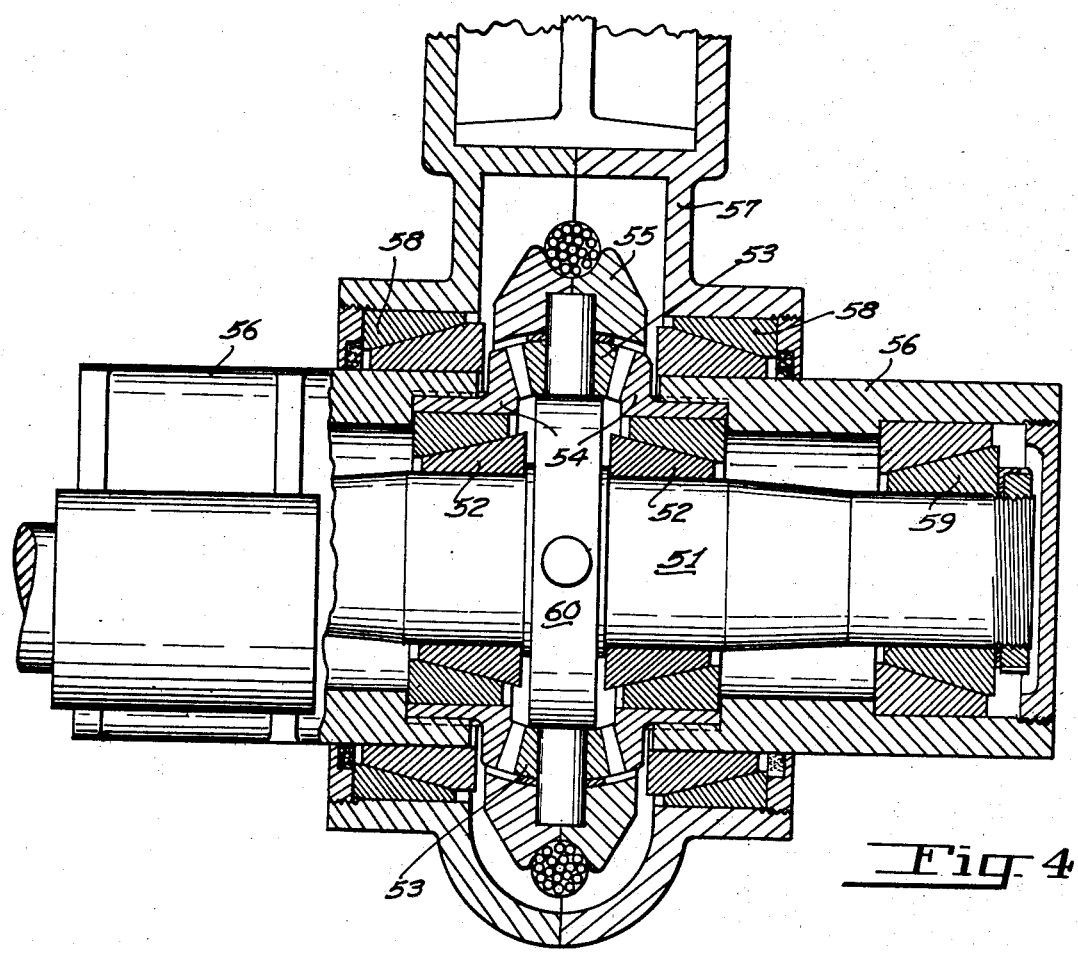
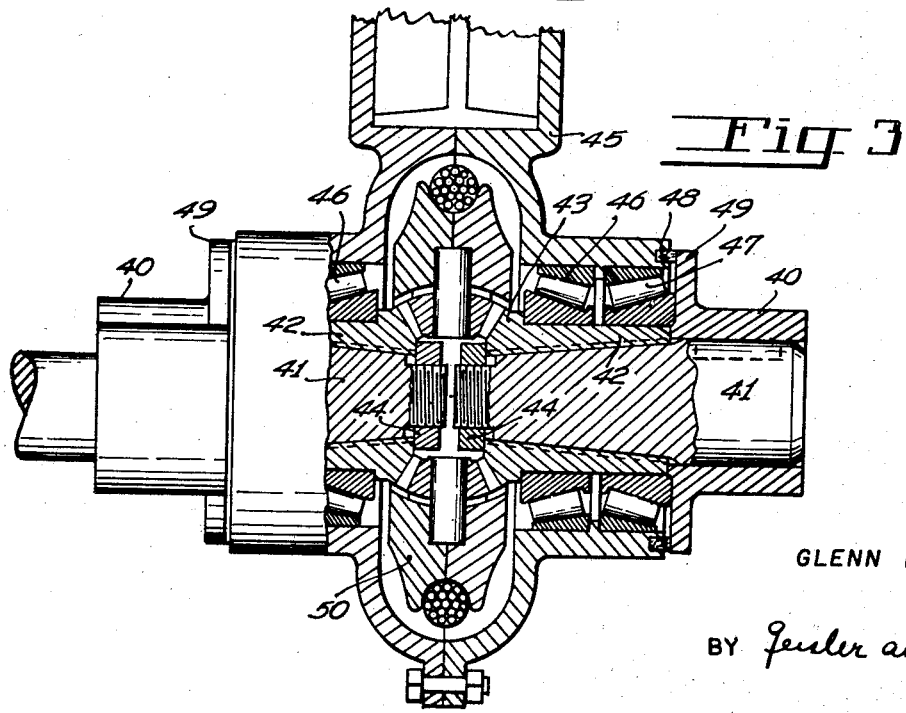

GLENN L. LARISON
INVENTOR

Patented June 11, 1946

2,401,766

UNITED STATES PATENT OFFICE 2,401,766

VEHICLE SUSPENSION

Glenn L. Larison, La Grande, Oreg., assignor to Larison Compensating Axle Corporation, a corporation of Oregon Application November 30, 1943, Serial No. 512,351

10 Claims. (Cl. 280—104.5)

1

This invention relates in general to vehicle wheel mountings of the compensating type in which wheels are provided in pairs, with each wheel so mounted that it may be raised separately above the other wheel of the pair, but with the two wheels remaining in parallel planes, spaced a constant distance apart, and with compensating mechanism interconnecting the pair so as to divide the load equally between them regardless of their raised or lowered positions.

An object of this invention is to provide an improved and simplified compensating mounting for the wheels of each pair in a vehicle suspension of this nature, which will not only serve to divide the load between the wheels but which can be so connected to the vehicle as to cushion the shocks transmitted to the vehicle from the wheels through the intermediary of the compensating mechanism.

Another object of this invention is to provide an improved vehicle suspension suitable for a single pair of vehicle wheels, each carrying an equal load on the same side of the vehicle, in which the necessity for the use of the usual vehicle spring will be eliminated.

A further object of this invention is to provide a spring mounting and compensating mechanism for a pair of wheel-carrying assemblies so arranged as to avoid the necessity of attaching any spring means or compensating mechanism to the free ends of the wheel-carrying assemblies, and furthermore to have as much as possible of the compensating mechanism and the mounting for the wheel-carrying assemblies enclosed in order to protect the same from dirt and grit.

These objects and other advantages I am able to attain by using a differential or compensating mechanism for interconnecting the wheel-carrying assemblies of the pair, by so mounting the compensating mechanism that it may be rotated on a horizontal axis as a single unit, by providing suitable means for controlling such rotation of the compensating mechanism as an entire unit; and by otherwise arranging the compensating mechanism and control means as hereinafter described with reference to the accompanying drawings in which:

Fig. 3 is an end elevation, partly in section, similar to Fig. 2, showing a modified construction which may be employed to carry out the principle of my invention;

Fig. 4 is another similar end elevation, partly in section, showing a further modified manner in which the compensating mechanism and wheel-spindle arms may be mounted;

Figure 2:
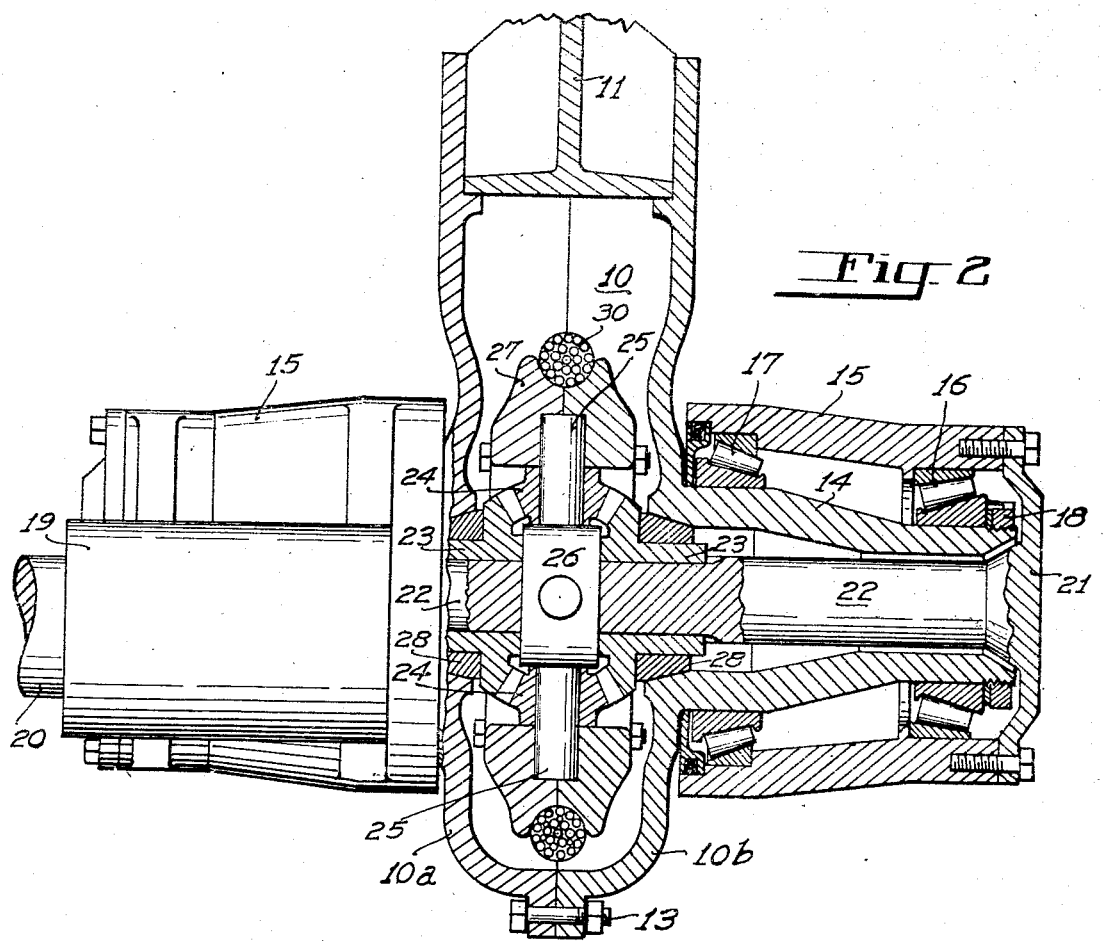
Fig. 2 is an end elevation, partly in section, of the vehicle suspension of Fig. 1, drawn to a larger scale with the wheels omitted, the view being taken from the right of Fig. 1 and thus from the rear of the vehicle looking toward the forward end.
Figure 1:
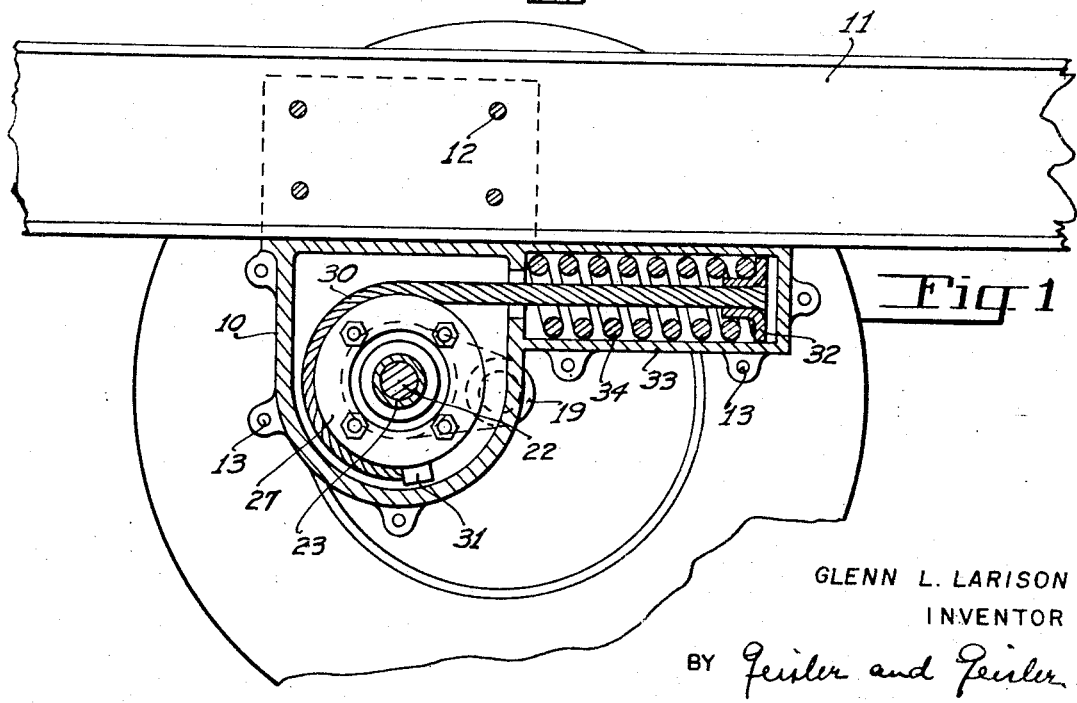
Fig. 1 is a fragmentary sectional side elevation of one form of vehicle suspension embodying my invention, the figure illustrating the invention used for a single pair of vehicle wheels.

Referring first to Figs. 1 and 2, a supporting member or bracket 10 is rigidly attached to the vehicle frame 11 by any suitable means such as the bolts 12. The bracket 10 is preferably formed of two companion half sections 10a and 10b which are secured together by bolts 13, the hollow interior of the bracket forming a housing for mechanism supported therein to be described later.

Each half section, 10a or 10b, of the supporting bracket 10 has an elongated hub portion 14, the hub portions extending oppositely in transverse horizontal alinement. A wheel-spindle assembly 15 is journaled on each hub portion 14 by means of bearings 16 and 17. A suitable lock nut 18 on the end of each hub portion 14 keeps the wheel-spindle assembly or arm 15 in place on the hub portion 14. A wheel spindle 20 is rigidly supported in the free end 19 of each wheel-spindle assembly.

A differential or compensating mechanism is rotatably mounted within the supporting member 10. The differential mechanism includes a pair of horizontal axially-alined shafts 22, to the inner ends of which the differential bevel gears 23 are keyed, and a plurality of differential pinions 24. The differential pinions 24 are journaled on stub shafts 25 which are mounted in a central support 26 and secured between the halves of the differential casing or pinion-supporting outer element 27. The entire differential mechanism is mounted for rotation by means of the bearings 28 disposed between the hubs of the bevel gears 23 and the interior surface of the supporting member 10. End plates 21, at the outer ends of the shafts 22, and preferably integral with the shafts, are bolted to the hubs of the wheel-spindle assemblies 15, as shown in Fig. 2.

The outer periphery of the pinion-supporting element or casing 27 is formed with a groove like a pulley to accommodate the control cable 30. One end of the cable 30 is secured to the casing 27 through the medium of a ferrule structure 31, or in any other suitable manner. The other end of the cable 30 is secured to a piston 32 (Fig. 1). The piston 32 is slidably mounted within a cylinder 33 which is preferably composed of semi-cylindrical sections formed integral with the half sections of the supporting member 10 as shown in Fig. 1. A compression spring 34, disposed within the cylinder 33, normally holds the piston 32 in the position shown in Fig. 1 and thus tends to prevent counter-clockwise rotation (as viewed in Fig. 1) of the differential casing and of the differential mechanism as an entire unit.

From the construction described it will be apparent that upward movement of one of the wheel-spindle arms, as occurs when one of the wheels of the pair passes over a bump or raised portion on the road surface, will cause a force to be exerted, through the connecting differential mechanism, on the other wheel-spindle arm in the opposite direction. But a sudden upward thrust on either or both of the wheel-spindle arms will result in partial rotation of the pinion-supporting element or casing 27 against the force of the spring 34. Thus the spring 34 acts to cushion any sudden shocks to the vehicle from the wheel-spindle arms.

In the modified construction shown in Fig. 3 the wheel-spindle arms 40 are directly secured to the outer ends of the horizontal shafts 41 of the differential mechanism. The differential bevel gears 43, to which the shafts 41 are keyed, have elongated hubs 42. Lock nuts 44 on the inner ends of the shafts 41 hold the bevel gears 43 and shafts 41 in fixed relation. The entire differential mechanism is rotatably supported within the supporting member or bracket 45 by means of suitable bearings 46 and 47. In order to prevent leakage of oil from the interior of the housing formed by the supporting bracket 45 the hub portions of the wheel-spindle arms 40 are formed with a flange 49 and an oil seal 48 is placed between each flange 49 and the adjacent end of the supporting bracket. The differential mechanism includes a casing 50, similar to the casing or pinion-supporting element 27 of Fig. 2, and a cable and coil spring, such as previously described, control the rotation of the differential casing and thus the rotation of the differential mechanism as an entire unit.

Fig. 4 illustrates another way in which the differential mechanism and wheel-spindle arms may be mounted in the supporting member and connected together. In the construction shown in this figure the differential mechanism comprises the differential gears 54, the usual differential pinions 53, and the pinion-supporting element or casing 55 similar to that in figures previously described. The differential gears 54 are keyed directly to the hubs of the wheel-spindle arms 56. The wheel-spindle arms are rotatably mounted within the supporting bracket 57 by the bearings 58, and the wheel-spindle arms 56 and the differential gears 54 are rotatably supported, by the bearings 59 and 52 respectively, on a central shaft 51 which extends through the "spider" 60 of the differential mechanism and into the hubs of both wheel-spindle arms.

Figure 5:
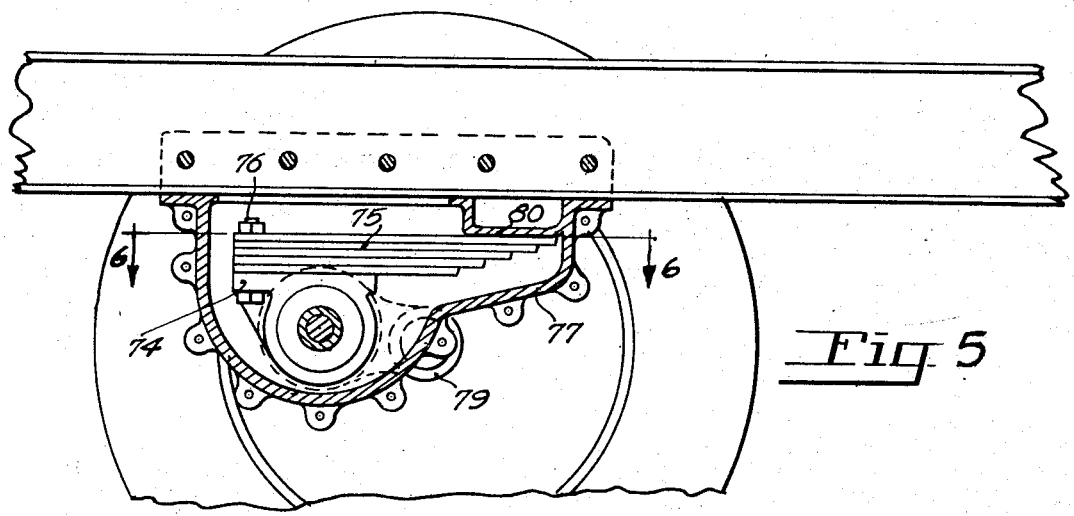
Fig. 5 is a fragmentary sectional side elevation similar to Fig. 1 but showing a leaf spring substituted for the coil spring and cable of Fig. 1.
Figure 6:
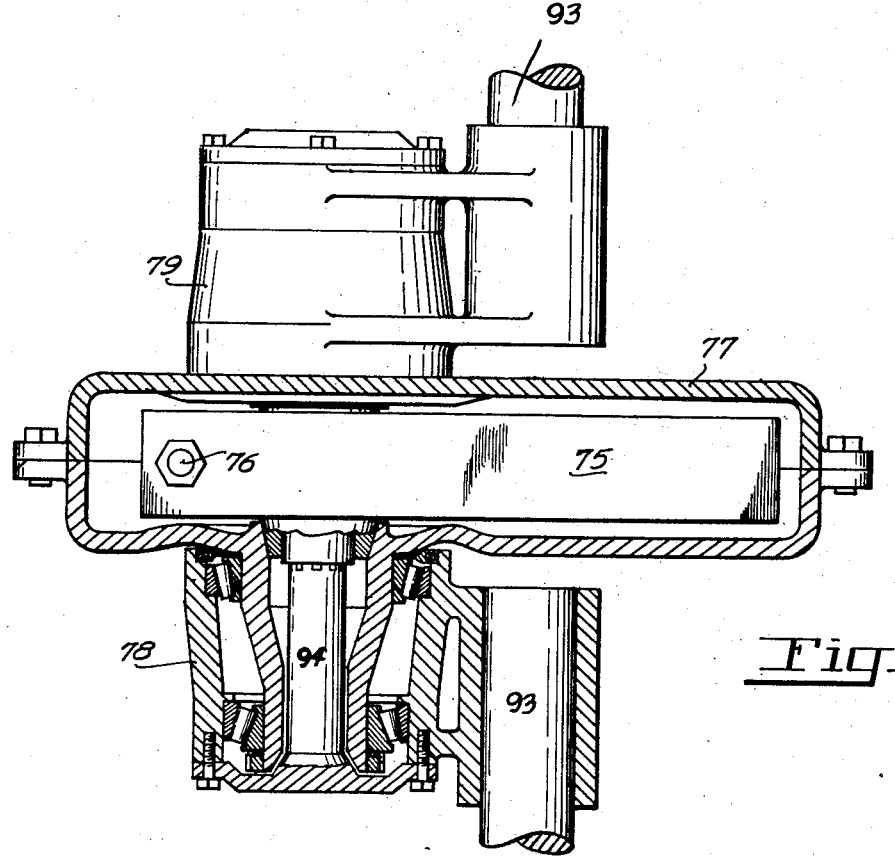
Fig. 6 is a sectional plan view corresponding to line 6—6 in Fig. 5, but with some portions broken away to show the structural details for the mounting of one of the wheel-spindle arms.

Although I have referred only to a coil spring as the cushioning and resilient element controlling the rotation of the entire differential mechanism in my invention, it is possible to use a small leaf spring for the same purpose. One way in which such a leaf spring may be employed is illustrated in Figs. 5 and 6. In this modified construction the casing for the differential mechanism is formed with a bracket-like arm 74 having a flattened top surface on which the leaf spring 75 is supported. The leaf spring 75 is secured thereto in any suitable manner, for example by a bolt 76. The wheel-spindle arms 78 and 79, carrying the wheel spindles 93, are supported on the bracket or housing 77, and the differential shafts 93 are supported within the housing in the same manner as shown in Fig. 2. The housing 77 is formed with an extension 80 to provide a rest for the free end of the leaf spring. As obvious from Figs. 5 and 6, this form of wheel suspension produces the same compensating, shock absorbing wheel mounting as the construction illustrated in Fig. 1. In this modified construction also the supporting bracket 77, preferably made in two half sections, provides a sealed housing which may be kept filled with oil, thus fully protecting the spring and associated parts from external dirt and grit and greatly simplifying the problem of proper lubrication.

Other modifications in the form and construction of the supporting housing bracket and in the resilient elements controlling the rotation of the entire compensating mechanism would be possible within the scope of my invention. It is not necessary that the differential mechanism be mounted for rotation on the same horizontal axis as the wheel-spindle arms inasmuch as the wheel-spindle arms might be pivoted on another horizontal axis and each wheel-spindle arm connected by a suitable gear to the respective members of the differential mechanism. But for all practical purposes it is simpler and preferable to have the wheel-spindle arms and the differential mechanism all mounted for rotation on the same horizontal axis. It is not my intention to limit my invention otherwise than as set forth in the claims.

I claim:

1. In a vehicle suspension, a compensating means supported for rotation as an entire unit on a horizontal axis, a pair of wheel-spindle assemblies pivotally mounted for movement in parallel vertical planes, said wheel-spindle assemblies connected to said compensating means, said compensating means so arranged that pivotal movement of one of said wheel-spindle assemblies in one direction will ordinarily cause relative opposite movement of the other wheel-spindle assembly but pivotal movement of both wheel-spindle assemblies in the same direction will cause rotational movement of said compensating means as an entire unit on said horizontal axis, and resilient means controlling such rotational movement of said compensating means.

2. In a vehicle suspension, a compensating mechanism supported for rotation as an entire unit on a horizontal axis, a pair of wheel-spindle assemblies pivotally mounted for movement in parallel vertical planes, said wheel-spindle assemblies connected to said compensating mechanism, said compensating mechanism so arranged that pivotal movement of one of said wheel-spindle assemblies in one direction will ordinarily cause relative opposite movement of the other wheel-spindle assembly but pivotal movement of both wheel-spindle assemblies in the same direction will cause rotational movement of said compensating mechanism as an entire unit, and means controlling such rotational movement of said compensating mechanism, said controlling means including a resilient element.

3. In a vehicle suspension, a compensating mechanism supported for rotation as an entire unit on a horizontal axis, a pair of wheel-spindle assemblies pivotally mounted on the same horizontal axis as said compensating mechanism for movement in parallel vertical planes, said wheel-spindle assemblies connected to said compensating mechanism, said compensating mechanism so arranged that pivotal movement of one of said wheel-spindle assemblies in one direction will ordinarily cause relative opposite movement of the other wheel-spindle assembly but pivotal movement of both wheel-spindle assemblies in the same direction will cause rotational movement of said compensating mechanism as an entire unit on the common horizontal axis in the same direction with said wheel-spindle assemblies, and means controlling such rotational movement of said compensating mechanism.

4. In a vehicle suspension, a differential mechanism mounted for rotational movement as an entire unit on a horizontal axis, said differential mechanism including a rotatable pinion-supporting element and differential pinions supported in said element, means controlling the rotation of said element, a pair of wheel-spindle assemblies pivotally mounted to move in parallel vertical planes, said wheel-spindle assemblies connected to said differential mechanism, said assemblies and differential mechanism so arranged that pivotal movement of one assembly will ordinarily result in opposite pivotal movement of the other assembly and pivotal movement of both assemblies in the same direction will result in rotational movement of said element against the force of said control means.

5. In a vehicle suspension, a differential mechanism mounted for rotational movement as an entire unit on a horizontal axis, said differential mechanism including a rotatable pinion-supporting element, resilient means controlling the rotation of said element, a pair of wheel-spindle assemblies pivotally mounted to move in parallel vertical planes and pivoting on the horizontal axis of said differential mechanism, said wheel-spindle assemblies connected to said differential mechanism, said assemblies and differential mechanism so arranged that pivotal movement of one assembly will ordinarily result in opposite pivotal movement of the other assembly and pivotal movement of both assemblies in the same direction will result in rotational movement of said differential element against the force of said resilient control means, whereby said resilient means will serve to cushion the shocks transmitted to the vehicle through said assemblies and differential mechanism.

6. In a vehicle suspension, a supporting means, a compensating mechanism mounted in said supporting means for rotation as an entire unit on a horizontal axis, a pair of wheel-spindle assemblies pivotally mounted on opposite sides of said supporting means for movement in parallel vertical planes, said wheel-spindle assemblies pivoting on the same horizontal axis as said compensating mechanism, said wheel-spindle assemblies connected with said compensating mechanism, and said assemblies and compensating mechanism so arranged that pivotal movement of one of said wheel-spindle assemblies in one direction will ordinarily produce relative opposite movement of the other wheel-spindle assembly but pivotal movement of both wheel-spindle assemblies in the same direction will cause rotational movement of said compensating mechanism as an entire unit in the same direction with said wheel-spindle assemblies, and resilient means controlling such rotational movement of said compensating mechanism as an entire unit.

7. In a vehicle suspension, a supporting bracket, a differential mechanism mounted in said supporting bracket for rotation as an entire unit on a horizontal axis, a pair of wheel-spindle assemblies pivotally carried by said supporting bracket for movement in parallel vertical planes, said wheel-spindle assemblies pivoting on the same horizontal axis as said differential mechanism, said wheel-spindle assemblies connected with said differential mechanism, and said assemblies and differential mechanism so arranged that pivotal movement of one of said wheel-spindle assemblies in one direction will ordinarily produce relative opposite movement of the other wheel-spindle assembly but pivotal movement of both wheel-spindle assemblies in the same direction will cause rotational movement of said differential mechanism as an entire unit in the same direction with said wheel-spindle assemblies, and resilient means controlling such rotational movement of said differential mechanism as an entire unit.

8. In a vehicle suspension, a composite supporting member, a differential mechanism mounted in said composite supporting member for rotation as an entire unit, a pair of wheel-spindle assemblies pivotally mounted in said composite supporting member for movement in parallel vertical planes, said wheel-spindle assemblies connected with said differential mechanism, and said assemblies and differential mechanism so arranged that pivotal movement of one of said wheel-spindle assemblies in one direction will ordinarily produce relative opposite movement of the other wheel-spindle assembly but pivotal movement of both wheel-spindle assemblies in the same direction will cause rotational movement of said differential mechanism as an entire unit, and resilient means controlling such rotational movement of said differential mechanism as an entire unit.

9. A mounting for a pair of vehicle wheels comprising, a supporting member, compensating mechanism mounted in said supporting member for rotational movement as an entire unit, said compensating mechanism including a central pinion-supporting element, a pair of arms pivotally mounted on said supporting member for pivotal movement in parallel vertical planes, a wheel spindle on each arm, said spindles extending in opposite directions, a vehicle wheel on each spindle, said arms and said element having a common axis of rotation, said arms connected to said compensating mechanism, and said arms and compensating mechanism so arranged that pivotal movement of one of said arms in one direction will ordinarily produce relative opposite movement of the other arm but relative movement of both arms in the same direction will cause rotational movement of said element in such direction, and means controlling such rotational movement of said element.

10. A mounting for a pair of vehicle wheels comprising, a composite supporting bracket, differential mechanism mounted in said supporting bracket for rotational movement as an entire unit, said differential mechanism including a case extending about the central portion with differential pinions supported therein, a pair of arms carried by said supporting bracket for pivotal movement in parallel vertical planes, a wheel spindle on each arm and a vehicle wheel on each spindle, said arms and said case having a common axis of rotation, said arms connected to said differential mechanism and said arms and differential mechanism so arranged that pivotal movement of one of said arms in one direction will ordinarily produce relative opposite movement of the other arm but relative movement of both arms in the same direction will cause rotational movement of said differential case in such direction, and resilient means controlling such rotational movement of said case, whereby said resilient means will serve to cushion the shocks transmitted to the vehicle through said arms and said mechanism.

GLENN L. LARISON.